United States Patent
Kohno et al.

(10) Patent No.: US 6,868,109 B2
(45) Date of Patent: Mar. 15, 2005

(54) SPACE HOPPING RECEIVING SYSTEM AND RECEIVED RADIO-WAVES ESTIMATION METHOD

(75) Inventors: Ryuji Kohno, Yokohama (JP); Satoru Ishii, Mobara (JP)

(73) Assignee: Futaba Corporation, Mobara (JP)

( * ) Notice: Subject to any disclaimer, the term of this patent is extended or adjusted under 35 U.S.C. 154(b) by 763 days.

(21) Appl. No.: 09/794,068

(22) Filed: Feb. 28, 2001

(65) Prior Publication Data

US 2001/0019575 A1 Sep. 6, 2001

(30) Foreign Application Priority Data

Jan. 3, 2000 (JP) ........................................ 2000-055556

(51) Int. Cl.[7] .......................... H04B 1/713; G06F 17/10
(52) U.S. Cl. ........................ 375/142; 375/143; 708/314
(58) Field of Search ................................ 375/131–136, 375/138, 347, 365, 142, 143, 150–153, 343; 708/314; 370/208; 455/437–440

(56) References Cited

U.S. PATENT DOCUMENTS

| | | | | |
|---|---|---|---|---|
| 3,783,385 A | * | 1/1974 | Dunn et al. .................. | 375/329 |
| 4,704,734 A | * | 11/1987 | Menich et al. ............... | 455/440 |
| 5,483,550 A | * | 1/1996 | Hulbert ....................... | 375/134 |
| 5,488,638 A | * | 1/1996 | Kazecki et al. ............. | 375/347 |
| 5,893,033 A | * | 4/1999 | Keskitalo et al. ........... | 455/437 |
| 5,940,454 A | * | 8/1999 | McNicol et al. ............ | 375/347 |
| 6,144,711 A | * | 11/2000 | Raleigh et al. ............. | 375/347 |
| 6,333,926 B1 | * | 12/2001 | Van Heeswyk et al. .... | 370/335 |
| 6,603,735 B1 | * | 8/2003 | Park et al. ................... | 370/208 |
| 6,650,653 B1 | * | 11/2003 | Horng et al. ................ | 370/437 |

FOREIGN PATENT DOCUMENTS

| | | | | |
|---|---|---|---|---|
| JP | 4-79427 | * | 3/1992 | ............ H04B/7/08 |
| JP | 11-55169 A | * | 11/1999 | ............ H04B/7/08 |

OTHER PUBLICATIONS

Ishii, S.; Hoshikuki, A.; Kohno, R.; Space Hopping Scheme Under Short Range Rician Multipath Fading Environment, Sep. 24–28, 2000, Vehicular Technology conference,2000. IEEE VTS–Fall VTC 2000, 52nd, vol. 1, page(s) 99–104.*
Kohno, R.; Spatial and Temporal Communication Theory Using Adaptive Antenna Array, Feb. 1998, Personal Communications, IEEE, vol. 5, Issue: 1, page(s) 28–35.*

* cited by examiner

Primary Examiner—Amanda T. Le
Assistant Examiner—Lawrence B. Williams
(74) Attorney, Agent, or Firm—Oblon, Spivak, McClelland, Maier & Neustadt, P.C.

(57) ABSTRACT

A receiving system or a received radio-wave estimation method is provided that can maintain received field strengths at a nearly uniform level under multipath conditions. The antenna switch can select outputs of four antennas at high speed. The high-frequency amplifier amplifies the output of the antenna switch and the demodulator demodulates amplified signals. The matched filter bank, surrounded with chain lines, receives a demodulated signal, for example, the I-phase component. In the matched filter bank, the phase shifter shifts respective signals output from four delay elements. The adder synthesizes the phase-shifted signals and then supplies the maximum matched output to the maximum level selector.

4 Claims, 5 Drawing Sheets

POWER STRENGTH

PHASE DISTRIBUTION

SPACE HOPPING RECEIVING SYSTEM AND RECEIVED RADIO-WAVES ESTIMATION METHOD

BACKGROUND OF THE INVENTION

1. Field of the Invention

The present invention relates to a space hopping receiving system that is effective at the place where the electric field strength largely varies due to multipath. Particularly, the present invention relates to a received radio-waves estimation method suitable for estimating interference waves from received radio waves in the frequency hopping system, which is one of spread spectrum communication systems.

2. Description of the Prior Art

Propagation characteristics in land mobile communications greatly depend on buildings around a receiving spot, on mobile velocities, on location of the receivers, and so on. Particularly, because reflected waves or scattered waves from ambient buildings during movement affect conditions of multiple propagation paths (multipath) and many waves via different communication paths interfere with each other, complicated standing waves occur. This largely changes the electric field strength of a received radio wave and changes randomly the phase thereof.

For example, FIG. 6(a) is a computer simulation of a received electric field strength which changes in a two-dimensional plane of 2 m×2 m (400 points) under conditions of multipath, where the vertical axis represents an field electric strength with respect to the x-y plane. FIG. 6(b) is a computer simulation of phase changes of the received field electric strength, where the vertical axis represents phase changes of received radio waves.

In the case of a 12.6 cm (in wave length ($\lambda$)) (i.e. 2.4 GHz) band radio wave, as shown in FIGS. 6(a) and 6(b), the phase and electric field strength largely vary even when a mobile body moves in a narrow space.

In order to receive radio waves of a field electric strength against the severe fading phenomenon, a variety of receiving systems have been used commercially and practically. Of those receiving systems, the diversity receiving system is well known as the most effective receiving system.

In the receiving system shown in FIG. 7(a), two antennas A1 and A2, spaced apart from one another, receive radio waves of a desired signal. The receiver 22 receives the signal output from the antenna catching the radio waves of higher electric-field strength, via the switch 21. The level detector 23 detects the strength of the captured signal. When the strength of the captured signal exceeds a threshold value, the switch 21 selects the other antenna.

This system can be simply configured by providing one receiver and an antenna changeover switch. However, when a strong interference wave or the type of a received signal is distinguished, a desired radio wave may not be certainly received. Moreover, the problem is that a time delay accompanying with the antenna switching time occurs.

In order to deal with such a problem, the receiving systems shown in FIG. 7(b) is well known. In this system, two antennas A1 and A2 are spatially separated by a distance. A signal received by one antenna is output via the phase shifter 31 and the variable gain amplifier 32. The synthesizer 33 synthesizes the resultant signal and the output signal of the other antenna. The receiver 34 captures the synthesized signal.

This system is a maximum ratio synthesizing system. According to this system, the detector 35 judges the S/N ratio based on the synthesized wave of the received radio wave and controls the variable phase shifter 31 and the variable gain amplifier 32. Thus, the received wave synthesis is carried out while the CNR is being weighted.

As described above, many measures have been considered to deal with the fading. That is, the system, which includes a number of antennas and receivers each for receiving radio waves via the antennas, performs the maximum ratio synthesis based on outputs from the respective receivers. The software antenna recently proposed may be used. However, such systems require an increased number of receivers and a complicated synthesis method. Hence, this makes it difficult to adapt such systems to slim portable receivers. Particularly, in the communication system where, for transmission and reception, spectrum is spread by frequency hopping, since the received frequency itself varies in a specific pattern, the electric field strength greatly changes due to multipath. As a result, it becomes difficult to estimate interference waves and desired radio waves.

SUMMARY OF THE INVENTION

The present invention is made to solve the above-mentioned problems.

Moreover, an objective of the invention is to provide a receiver that can capture radio waves containing plural frequency components under multipath conditions so as to maintain the field strengths thereof at a nearly constant level.

Particularly, the present invention relates to a receiver that detects a specific received wave from radio waves frequency-hopped and received in the spread spectrum communication system, that is, that is effective to estimate interference waves and then to estimate channel information having a desired hopping pattern.

In order to achieve the above mentioned objects, a space hopping receiving method comprises n receiving antennas arranged so as to be respectively spaced a predetermined distance, an antenna switch for capturing received signals received by said n receiving antennas in a time division mode, and a receiver for demodulating a received signal selectively captured by the antenna switch.

N delay elements create a demodulated signal and $2^n$ matched filters each have different output characteristics. Of the levels of signals output from the matched filters, a matched filter output with a maximum value is captured as a received radio wave.

The above-mentioned received radio wave is a received wave in a spread spectrum system and has a frequency that hops according to a specific pattern. Receiving such signals allows interference waves and desired received waves to be easily estimated even in such a condition that phase information and electric field level are varying due to multipath.

BRIEF DESCRIPTION OF THE DRAWINGS

This and other objects, features, and advantages of the present invention will become more apparent upon a reading of the following detailed description and drawings, in which.

DETAILED DESCRIPTION OF THE PREFERRED EMBODIMENT

A space hopping receiving system according to an embodiment of the present invention will be described below with reference to the attached drawings.

Figure 1:
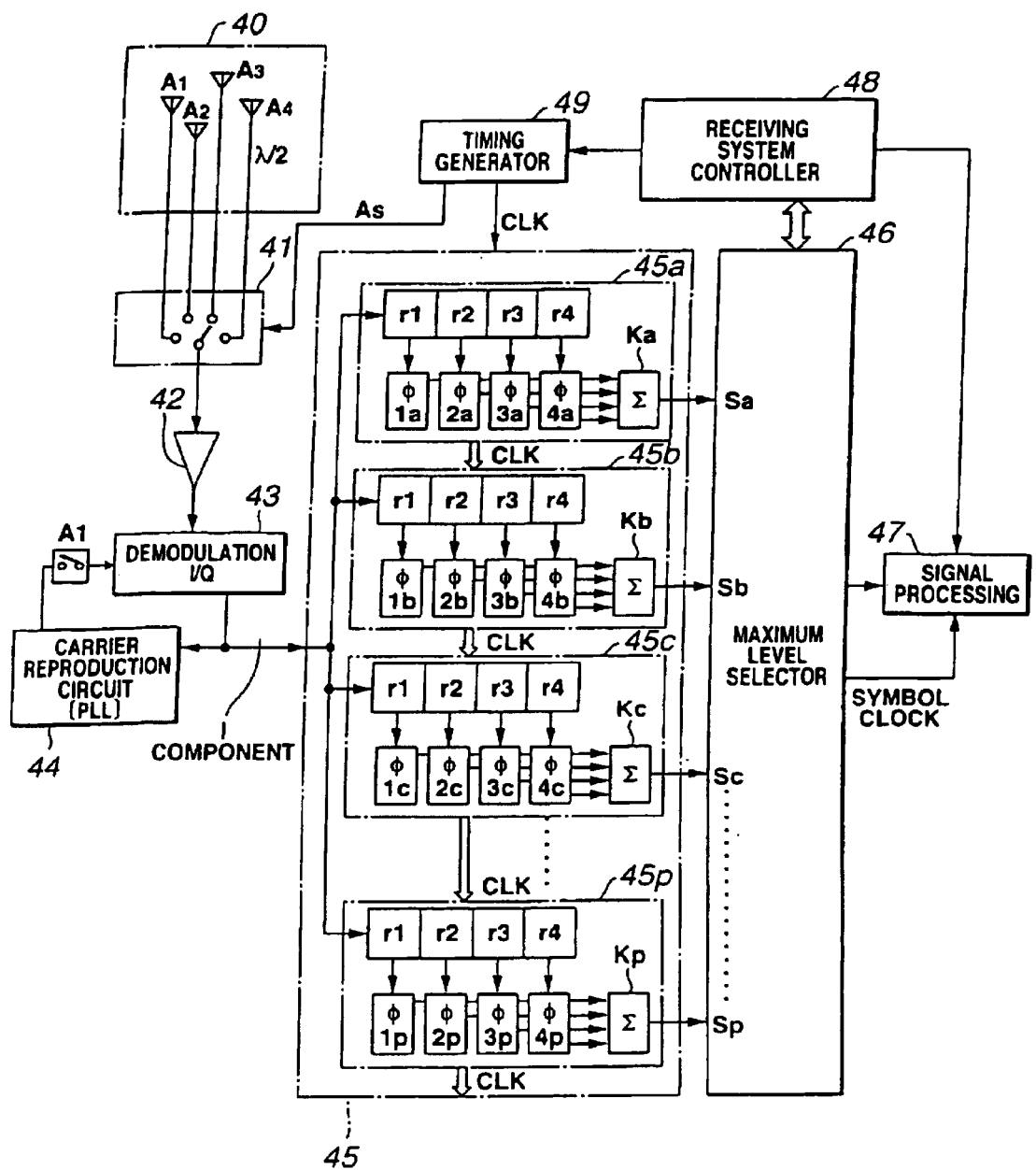
FIG. 1 is a block diagram schematically illustrating a space hopping receiving system according to an embodiment of the present invention.

Referring to FIG. 1, a space hopping receiving system having four receiving antennas will be generally explained below.

In the case of n=4, four antennas A1, A2, A3, and A4 are arranged in the two-dimensional plane at predetermined intervals, for example, $\lambda/2$. An antenna switch 41 selects signals received by the four antennas at high speed.

A high-frequency amplifier 42 amplifies the output of the antenna switch 41. A demodulator 43 demodulates signals amplified by the amplifier 42.

When BPSK (Binary Phase Shift Keying) or symbol, for example, is a DPSK (Differential Pulse-shift Keying) modulation wave of which the phase is inverted with data representing 1, the demodulator 43 performs synchronous detection of received radio waves by multiplying it by a signal from the carrier reproduction circuit 44. In this case, the carrier reproduction circuit 44, for example, creates demodulated carrier signals in synchronous with the carrier signal of the antenna A1.

The carrier reproduction circuit 44 may be configured of a PLL circuit formed of the Costas loop circuit previously proposed by the present applicant. Even when the phase of a carrier largely changes, the carrier reproduction circuit 44 produces a demodulated carrier signal to demodulate information corresponding to the phase.

The demodulated signal I, for example, component is supplied to the matched filter bank 45 (surrounded with chain lines).

In the case of n=4, the matched filter bank 45 is formed of 16 (i.e., $2^n$) matched filters 45a, 45b, 45c, ..., 45p. Each of matched filters of the bank 45 includes four delay elements. In the matched filter 45(a), the phase shifters φ (1a to 4a) respectively phase-shift signals output from delayed elements r1, r2, r3, and r4. In the matched filter 45(b), the phase shifters φ (1b to 4b) respectively phase-shift signals output from delayed elements r1, r2, r3, and r4. In the matched filter 45(c), the phase shifters φ (1c to 4c) respectively phase-shift signals output from delayed elements r1, r2, r3, and r4. In the matched filter 45(p), the phase shifters φ (1p to 4p) respectively phase-shift signals output from delayed elements r1, r2, r3, and r4. Each of the adders Ka to Kp synthesizes the shifted signals.

The phase shifter φ of each matched filter provides, for example, a phase amount of (φ=0) and an inverted phase of (φ=180°). The phase shift amounts are differently arranged for each matched filter.

For example, in the matched filter 45a, the phase shifters φ1a, φ2a, φ3a, and φ4a have phase shift amounts of 0, 0, 0, and 0, respectively. In the matched filter 45b, the phase shifters φ1b, φ2b, φ3b, and φ4b have phase shift amounts of 0, 0, 0, and 180, respectively. In the matched filter 45c, the phase shifters φ1c, φ2c, φ3c, and φ4c have phase shift amounts of 0, 0, 180, and 0, respectively.

As described above, each phase shifter inverts or maintains the phase of a signal. A 180°-phase shifter can be formed of inverted amplifiers. Such matched filters of $2^n$ are arranged.

The maximum level selector 46 receives outputs of the adders Ka to Kp and selects a matched output with a maximum absolute value. The maximum level detector 46 selects the output of a matched filter in which the adder outputs a maximum level and then outputs it to the signal processing circuit 47.

In the above-mentioned configuration, each of the matched filters 45a to 45p includes delay elements r1, r2, r3, and r4. Alternatively, since common current is flowing through the respective delay elements in each matched filter, the phase shifters (φ1a to φ1p), (φ2a to φ2p), (φ3a to φ3p), and (φ4a to 4p) corresponding to the number (i.e., 16) of matched filters may be connected to a row of delay elements r1, r2, r3, and r4. Thus, signals of each group of phase shifters may be added.

The maximum level detector 46 includes a comparator for comparing the outputs (or absolute values) of respective adders and a selector for selecting an output of a comparator which outputs a signal of a maximum level based on the output of the comparator. The maximum level detector 46 supplies the output of the matched filter in which the composite level of radio waves received by respective antennas is maximized, to the signal processing circuit 47.

The system controller 48 controls the whole of the receiving system. The reference signal generator 49 generates various timing signals.

Figure 2:
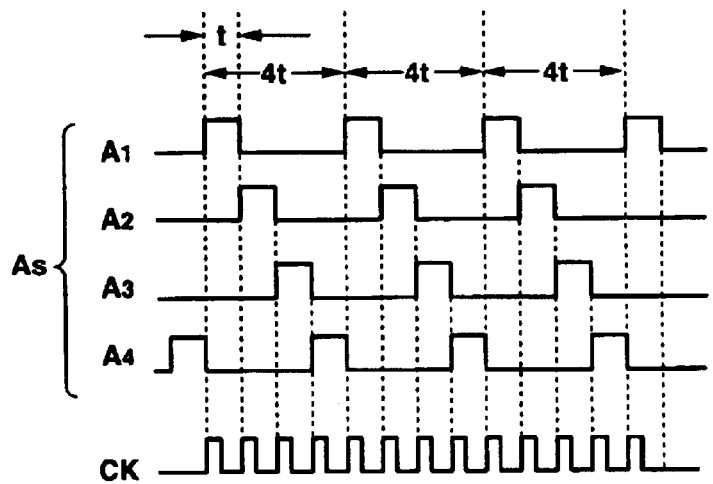
FIG. 2 is a waveform diagram illustrating an antenna switching timing and a delay timing of a matched filter.

FIG. 2 illustrates timing signals As for the switching of an antenna and the clock CK representing a delayed timing of a matched filter.

As shown in FIG. 2, the antenna 41 outputs received signals while the antennas A1 to A4 are being sequentially selected with the timing signals As, for example, every period (t). Meanwhile, the signals sequentially delayed in the matched filter are output to the phase shifters in synchronization with the changeover timing (t) of the antenna 41.

When the received radio wave is a BPSK (or DPSK) signal containing information, one antenna switching period (4t) is set so as to switch antennas several times during one symbol period (to select all antennas at least one cycle). Thus, received information can be demodulated.

When a received radio wave is being subjected to frequency hopping, it is desirable to switch the antennas in one step of the frequency (as described later).

Figure 3A:
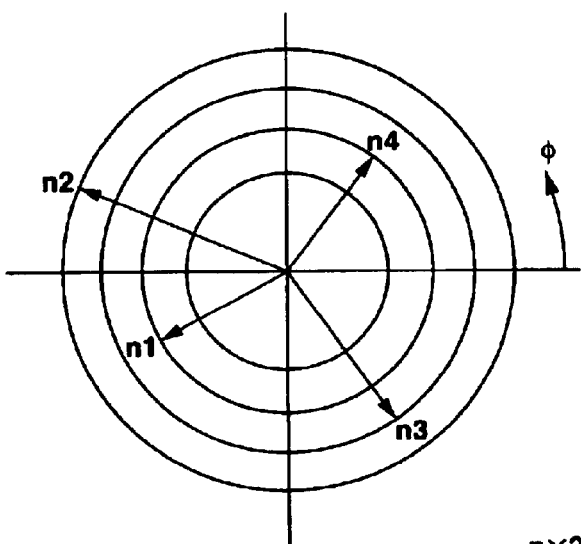
FIG. 3 is an explanatory diagram illustrating the phase of a received signal selected by a matched filter.

FIG. 3(a) illustrates output phases and electric fields of each antenna plotted on the phase plane in a specific time period when four antennas receive radio waves of a specific frequency of which the electric field strength and phase are varying.

Respective antenna outputs n1, n2, n3, and n4 are respectively received in a different phase state on the phase plane while the receiving levels thereof differ from each other under multi path conditions.

Figure 3B:
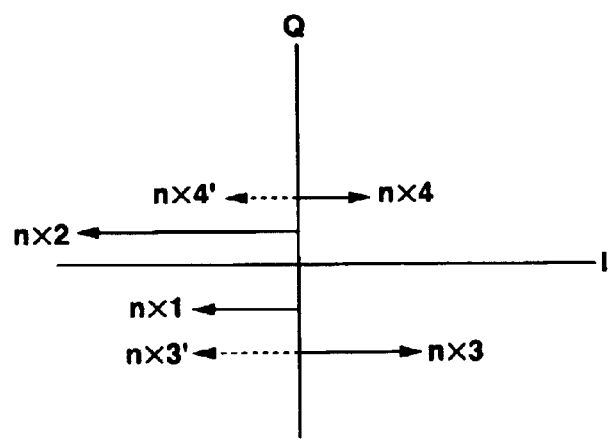

Respective antenna outputs in such a receiving state are demodulated on the I-axis and are respectively output as (n×1), (n×2), (n×3), and (n×4), as shown in FIG. 3(b). Hence, adding the demodulated outputs with the phases without any change provides the output of ((n×3)+(n×4)−(n×2+n×1)). Hence, when the antenna outputs are cancelled, a large output level cannot be obtained.

However, the matched filter 45h, in which the phase shifters have phase shift amounts of, for example, 0, 0, 180, and 180, respectively, outputs the demodulated output signals (n×4') and (n×3') of FIG. 3(a). The signal (n×4') is obtained by inverting the phase of the demodulated signal (n×4) by 180°. The signal (n×3') is obtained by inverting the phase of the demodulated signal (n×3) by 180°. The demodulation level output from the adder Kh in the matched filter 45h becomes ((n+3')+(n+4')+(n+2)+(n×1)), which is larger than the demodulated output obtained by merely adding respective antenna outputs without phase shifting.

The latch circuit, for example, latches outputs of the adders K(a) to K(p) every period (4t). Of the outputs of the adders, the maximum level detector 46 outputs the maximum output to the signal processing circuit. The signal processing circuit demodulates the maximum output. Thus, desired radio waves can be effectively received using the four antennas.

In the above-mentioned receiving system, since antennas are installed on a mobile body running at high speed, the multipath condition is always changing. As a result, since the received output is controllably captured from the matched filter with optimum phase characteristics even in large changes in received electric field, thus always being obtained in a uniform receiving level. This receiving system is effective as a receiver for SHF-band radio waves under strong fading.

Moreover, as described later, even in the spread spectrum (SS) communication system which transmits information while hopping frequencies of received radio waves, without limiting to mobile bodies, the uniform received level can be always acquired effectively against changes in multipath received electric field caused by frequency variations.

The present invention may employ a given number of antennas, other than four antennas. The use of a larger number of antennas can increase the uniformity of received electric field level. However, the use of antennas of more than a certain number results in a large scaled signal processing circuit, thus decreasing the effectiveness.

Conventionally, the SS communication system is known as one communication system. The spread spectrum communication system is roughly classified into a direct sequence (DS) system and a frequency hopping (FH) system.

The DS system is a communication system of DS modulating original data in a code sequence called a spread code. This system spreads the spectrum of a signal with DS modulation to improve the anti-noise characteristics. A pseudo noise (PN) sequence code is generally used as a code sequence for spreading the signal spectrum.

On the other hand, the FH system is the communication system of switching frequency channels in a pseudo random order and in a predetermined order every fixed period.

When communications are conducted using the FH system, the same hopping pattern is previously set to the transmitter and the receiver.

Figure 4:
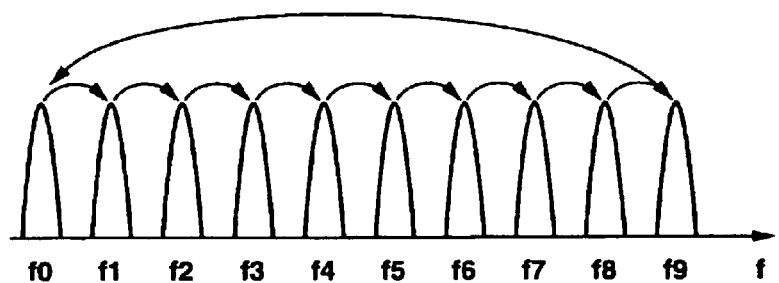
FIG. 4 is an explanatory diagram illustrating the principle of a frequency hopping system.

FIG. 4 is a diagram explaining the principle of the FH system. In the FH system shown in FIG. 4, 10 channels f0 to f9 are prepared as frequency channels. In the hopping pattern as illustrated, the frequency channel is hopped in the order of f0→f1→f2→. . . f9→f0.

In an actual hopping pattern, the frequency channel is hopped in a random order for each receiver/transmitter.

Here, 10 frequency channels will be explained but 20 to 40 frequency channels are actually prepared.

In the communications between the transmitter and the receiver using the FH system, the receiver has to hop the received frequency (received channel) in synchronization with the transmission frequency (transmission channel) of a transmission signal transmitted from the transmitter. For that reason, it is required that the receiver establishes the so-called initial synchronization where the receive frequency is synchronized with the transmission frequency of the transmitter.

Figure 5:
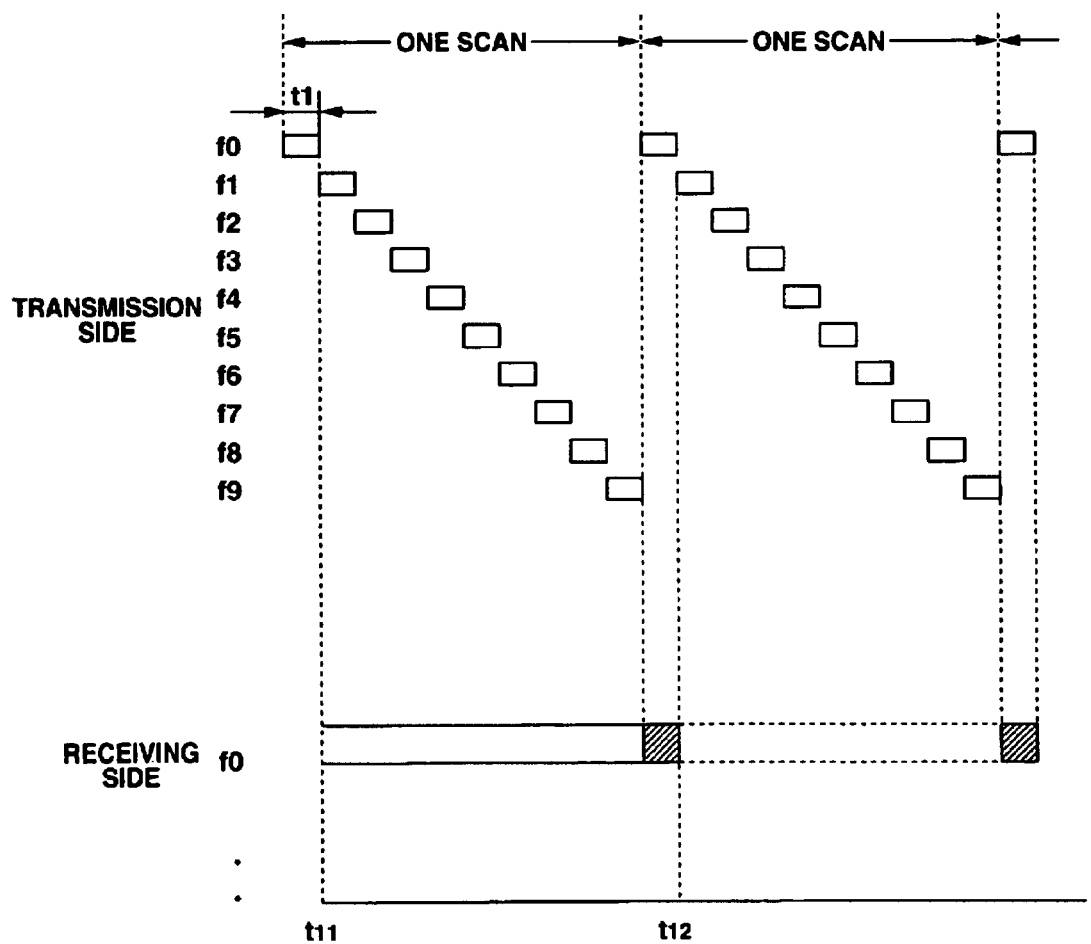
FIG. 5 is a diagram explaining a conventional initial synchronization establishment operation.
Figure 6A:
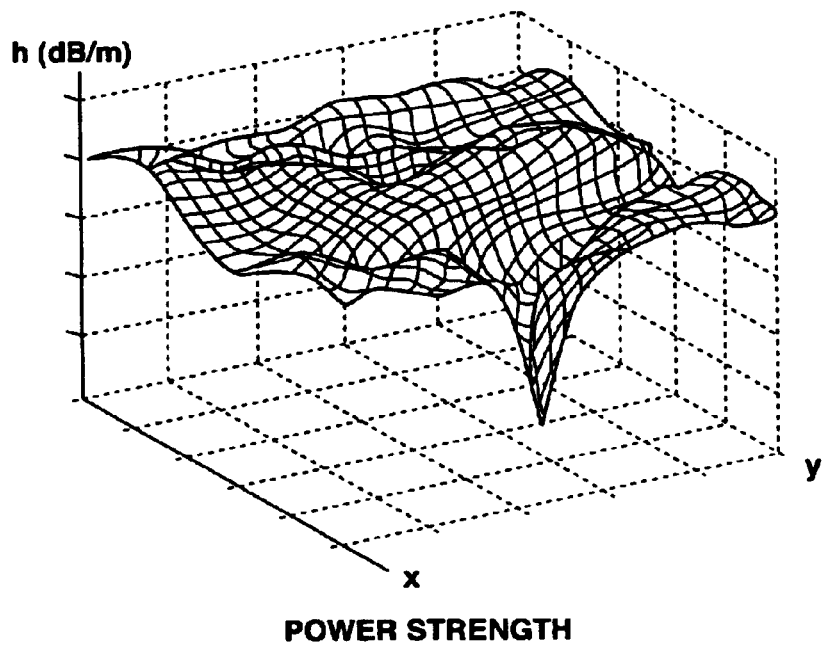
FIG. 6 is a diagram illustrating electric field strengths under a multipath condition, plotted on a two-dimensional plane.
Figure 6B:
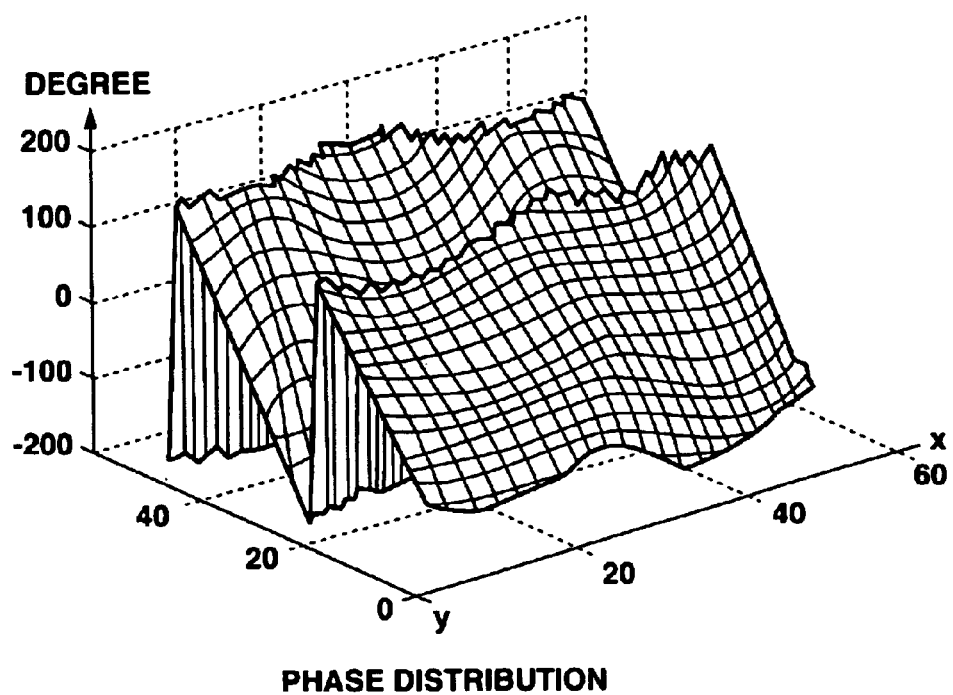
Figure 7A:
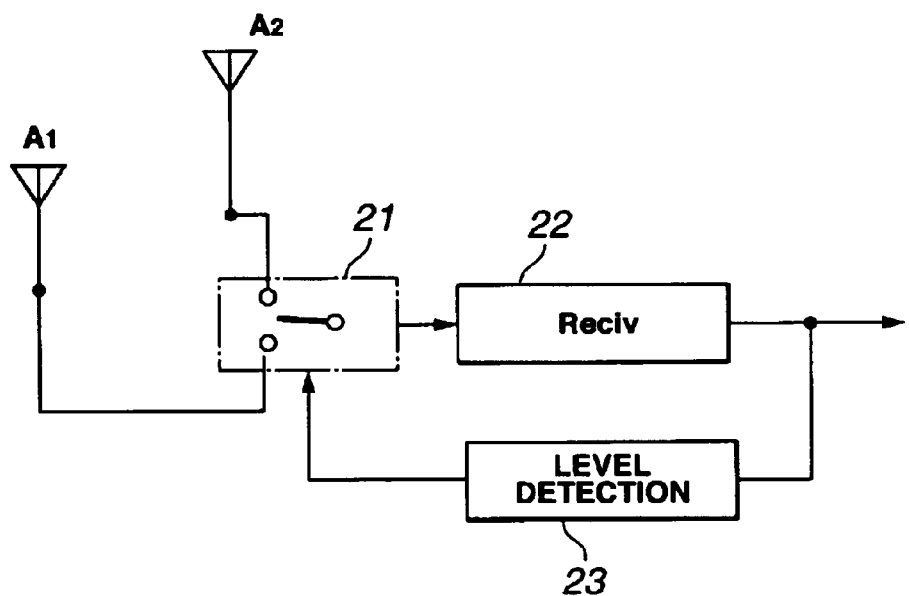
FIG. 7 is a diagram illustrating phase variations under a multipath condition, plotted on a two-dimensional plane.
Figure 7B:
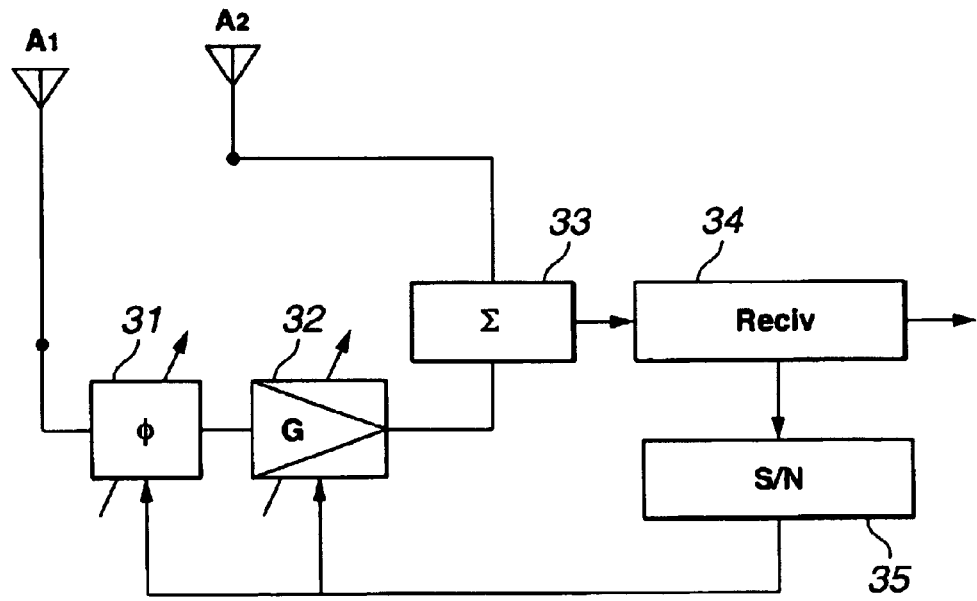

FIG. 5 is an explanatory diagram illustrating the operation of establishing initial synchronization in the FH system receiver.

Since the receiver previously recognizes the hopping pattern of a transmission signal transmitted from the transmitter to the terminal of the receiver, the receiver can establish the synchronization with the transmitter when once receiving the transmission signal.

Hence, when the transmission frequency of a transmission signal from the transmitter, as shown in FIG. 5, is hopped in the order of f0→f1→f2→. . . f9→f0 . . . , the receiver fixes the received frequency to a frequency channel, for example, the frequency channels f0 among all frequency channels f0 to f9 and thus waits for signals from the transmitter. For example, the synchronization with the transmitter can be established when the self-identification code is detected at the frequency channel f0.

The above-mentioned method is simple but provides a low synchronization probability when the receiving state of the frequency channel f0 is very bad under multipath conditions. However, that method has the advantage in that the use of the space hopping receiving system allows a high-level receive signal to be captured independently of the frequency even under any multipath receiving condition.

Hence, the space hopping system of the present invention can estimate a received radio wave addressed to the self terminal with very strong probability, thus providing strong synchronization probability.

In the above-mentioned conventional synchronization establishing method, the duration in which the received frequency of the receiver coincides with the transmission frequency of the transmitter corresponds to the initial synchronization establishment time. However, it is desirable to make the initial synchronization establishment time as short as possible.

Let us now consider the case where the initial synchronization takes the longest time in the above-mentioned initial synchronization establishment method. For example, it is considered that the receiver becomes a receiving state in the frequency channel f0 at the timing t11 the transmitter has transmitted a transmission signal in the frequency channel f0, as shown in FIG. 5.

In such a case, the initial synchronization is established at the timing t12 the transmitter ends one scanning operation and then transmits the transmission signal in the frequency channel f0.

Even if it is assumed that t1 is the time for which a transmission signal transmitted from the transmitter resides in one frequency channel and that the changeover time during which the frequency channel is changed is ignored, the time required for initial synchronization becomes the number of frequency channels multiplied by residence time t1.

Generally, 20 to 40 channels are prepared in the FH system. Assuming that 40 channels are prepared and that residence time t1 per frequency channel is 10 ms, the longest time taken for the initial synchronization in the worst timing is 400 ms i.e., 40 channels×10 ms).

That is, in order to start communications between the transmitter and the receiver, communications can be established after 400 ms from the beginning of detection of received radio waves by the receiver. This results in an unrealistic system.

Actually, there are some systems in which the residence time t1 of each channel is long, e.g. several 100 ms. Such systems require several seconds to establish initial synchronization.

In the conventional FH system, the initial-synchronization establishment time is determined based on the number of channels and the residence time t1 of each channel. Hence, the conventional FH system has the disadvantage in that the initial-synchronization establishment time is prolonged in proportional to the number of channels and the residence time t1.

Upon initial synchronization establishment, the receiver may not be able to receive signals transmitted from the transmitter in the environment of the communication path between the transmitter and the receiver. Such an environment includes multipath fading which occurs due to transmission radio waves reflected from and synthesized by buildings, or shadowing or interference which occurs transmission radio waves shielded by geographic features, building, plants, or vehicles. However, in order to deal with such a severe case, there is the system of broadband-receiving signals all over the channels of frequency channels in the FH system, for example, upon establishment of initial synchronization, performing a digital process using the digital processing circuit, and then estimating the frequency channels.

In this case, since widening the receiving band leads to widening the frequency band receiving thermal noises, the thermal noise energy $W_N$ ($W_N = k \times T \times B$, where k is a Boltzmann constant, T is an absolute temperature, and B is a band width) increases. This results in a decrease of Eb/No (Eb is an energy per bit and No is noise) decreases, thus decreasing the receiving sensitivity. However, when the receive frequency is swept to receive in short time all frequencies within a receive frequency band and when the receiving system in the space hopping scheme is used, differences between electric field strengths decrease within the receive frequency band. Hence, since a receive signal with a specific hopping pattern can be always obtained in a uniform level to a specific hopping frequency signal in a frequency band, the receive signal estimation capability can be improved.

As described above, the space hopping system of the present invention can always receive the field strength in a nearly fixed state even in the receiving spot where the electric field strength largely changes due to a mobile body or frequency under multipath conditions in which complicated reflections are occurring due to many obstacles. Particularly, the present invention can configure a high-performance receiving system in the SHF-band communication medium.

Moreover, in communications in the spectrum spread spectrum system where the received frequency varies, when necessary radio waves are estimated to establish synchronization establishment, a desired received wave can be certainly decided using the space hopping reception.

What is claimed is:

1. A space hopping receiving method comprising:

n (where n is a positive integer) receiving antennas arranged so as to be respectively spaced a predetermined distance;

an antenna switch for capturing received signals received by said n receiving antennas in a time division mode;

a demodulator for demodulating a received signal selectively captured by said antenna switch;

n delay elements for creating a demodulated signal; and $2^n$ matched filters each having different output characteristics, wherein, of the levels of signals output from said matched filters, a matched filter output with a maximum value is captured as a received radio wave.

2. The space hopping receiving system defined in claim 1, wherein each of said matched filters comprises:

n delay elements for delaying a signal in synchronization with a switching period of said receiving antennas;

phase shifters for phase-shifting outputs of said delay elements; and an adder for adding said outputs of said phase shifters.

3. The space hopping receiving system defined in claim 1, wherein said plural antennas are arranged in such a way that a transmission side receives radio waves in a spread spectrum system of which the frequency is hopping according to a specific pattern.

4. A received radio wave estimation method comprising the steps of:

analyzing a signal received in a space hopping receiving system, said space hopping receiving system including, n (where n is a positive integer) receiving antennas arranged so as to be respectively spaced a predetermined distance, an antenna switch for capturing received signals received by said n receiving antennas in a time division mode, a demodulator for demodulating a received signal selectively captured by said antenna switch, n delay elements for creating a demodulated signal, and $2^n$ matched filters each having different output characteristics, wherein, of the levels of signals output from said matched filters, a matched filter output with a maximum value is captured as a received radio wave; and estimating a hopping pattern of a received radio wave.

* * * * *